United States Patent [19]
Bennett

[11] Patent Number: 5,223,977
[45] Date of Patent: Jun. 29, 1993

[54] TWO SIDED MARKER

[76] Inventor: Reginald S. Bennett, P.O. Box 247, Station F, Toronto, Ontario, Canada, M4Y 2L5

[21] Appl. No.: 775,751

[22] Filed: Oct. 15, 1991

Related U.S. Application Data

[63] Continuation-in-part of Ser. No. 617,766, Dec. 26, 1990, Pat. No. 5,115,343.

[51] Int. Cl.⁵ .............................................. G02B 5/124
[52] U.S. Cl. .................................... 359/530; 359/515; 359/529; 359/553; 404/14; 116/63 R
[58] Field of Search ............... 359/515, 527, 529-532, 359/546, 547, 551, 552, 553; 404/14, 16; 116/63 R, 63 P, 63 T, 63 C

[56] References Cited

U.S. PATENT DOCUMENTS

| 2,561,016 | 3/1950 | Ford et al. | 116/63 P |
| 4,428,320 | 1/1984 | Oplt et al. | 404/14 |
| 4,440,104 | 4/1984 | Bleiweiss et al. | 359/553 |
| 4,466,376 | 8/1984 | Wells | 116/63 C |
| 4,726,706 | 2/1988 | Attar | 404/16 |
| 4,770,495 | 9/1988 | Lees | 359/553 |
| 4,778,250 | 10/1988 | McRoskey et al. | 359/553 |
| 4,875,799 | 10/1989 | Harrison | 359/351 |

Primary Examiner—Bruce Y. Arnold
Assistant Examiner—James Phan

[57] ABSTRACT

The marker has a pair of upwardly converging reflectant planar panels facing approximately in opposite directions. In its correct attitude on a support surface the panels slope at 2°-6° to the vertical if the marker is intended for assisting the landing of fixed wing aircraft and at 8°-10° to the vertical if the marker is intended for assisting the landing of helicopters. The reflectant panels are preferably retroreflectant.

9 Claims, 5 Drawing Sheets

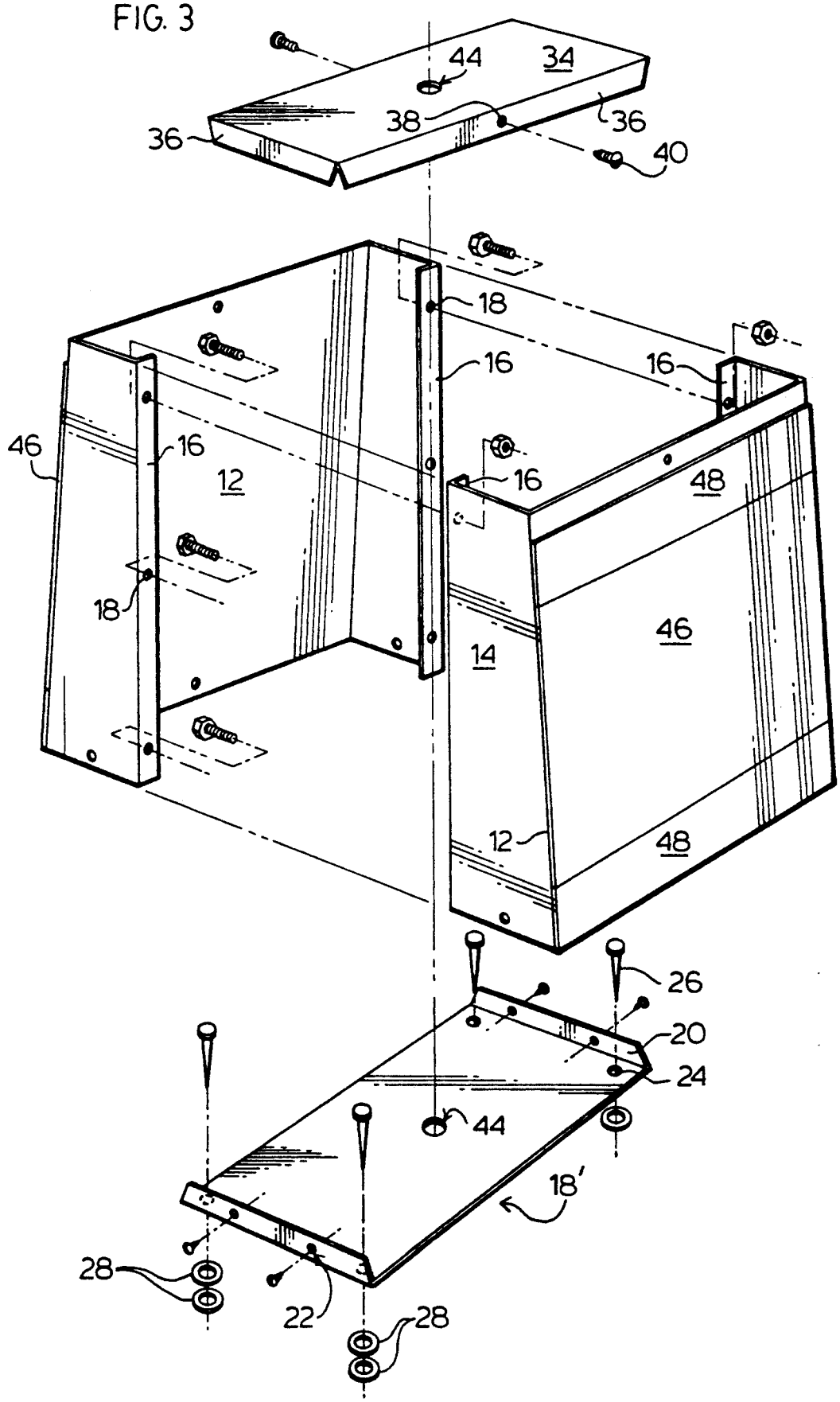

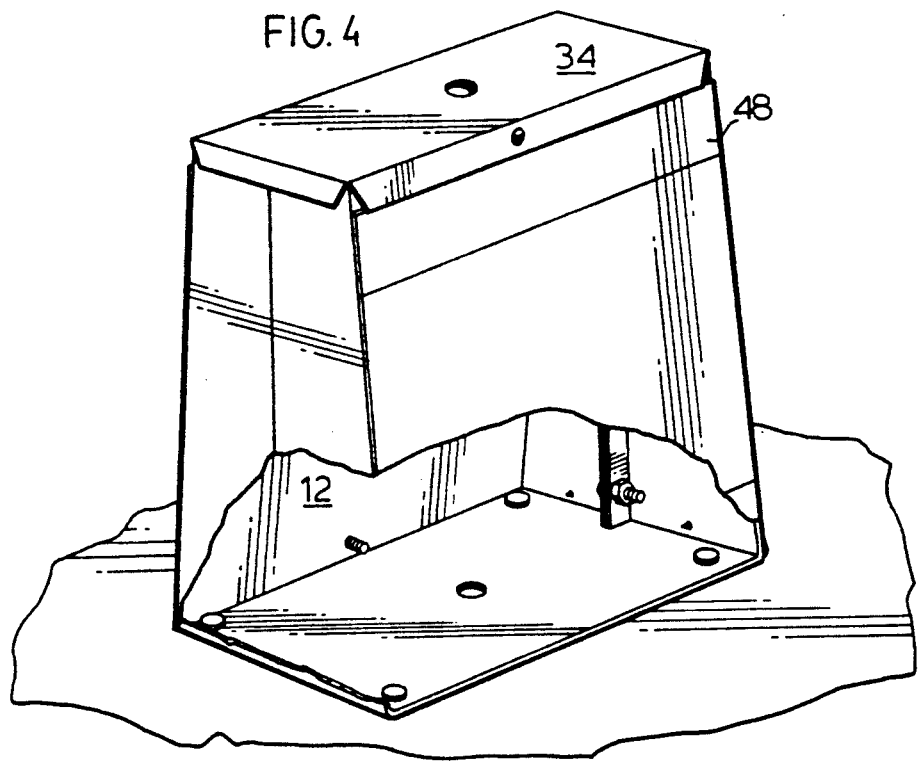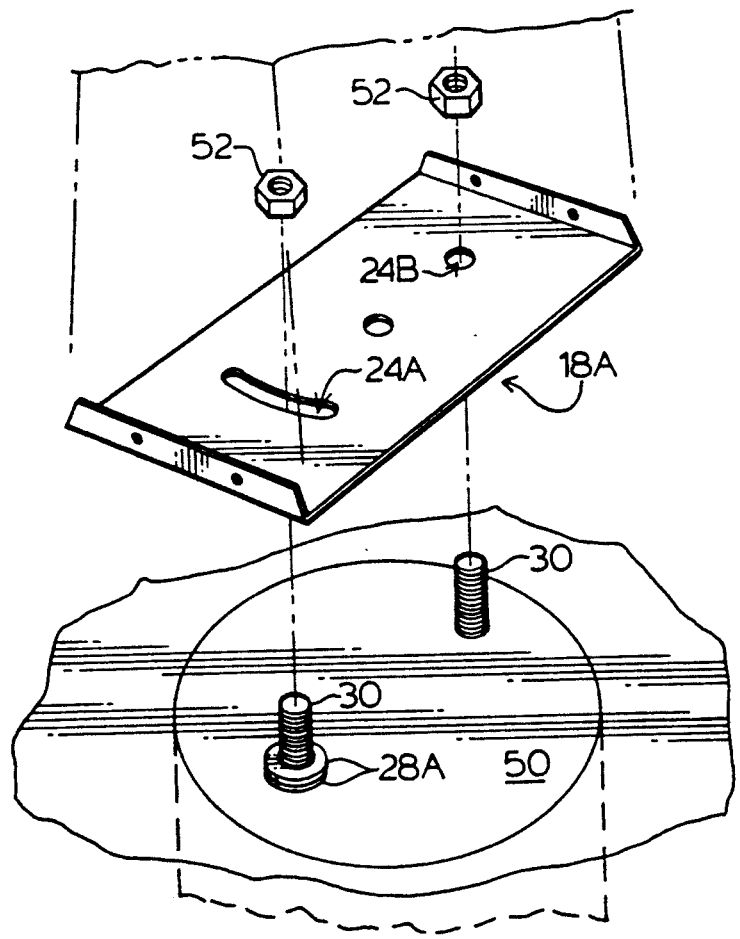

TWO SIDED MARKER

This application is a continuation-in-part of application Ser. No. 07/617,766 filed Dec. 26, 1990 now U.S. Pat. No. 5,115,343.

This invention relates to a marker for use in marking unlighted runways or helicopter landing pads in remote areas.

There is a considerable need for a cheap and efficient reflector marker for remote runways which may located in areas without a practically available source of power. Such a cheap and efficient reflector marker may also required as back up, for use on a normally lighted runway, in case of power failure. There is an analogous need for helicopter pad markers.

The invention provides an economical and efficient runway marker for fixed wing aircraft and helicopters, having means for mounting the marker adjacent a runway in a predetermined attitude. The marker has a pair of substantially planar panels joined to face in approximately opposite directions. Each panel extends upwardly and slopes toward the other and slopes at an angle of about 4°-12° to the other panel, for fixed wing aircraft, whereby the reflector may be mounted in said attitude with the panels each sloping at 2°-6° to the vertical, a substantial part of each of said surfaces being reflectant. (For helicopters the panels will converge at 16°-20° and slope at 8°-10° to the vertical when int he desired attitude).

By retroreflection herein is meant reflection back toward the source of the incident ray.

There is thus provided a convenient runway marker which may be used in a series of spaced locations on each side of the runway, with the planar reflectant surfaces at 2°-6° to the horizontal to correspond to the preferred 3° descent angle for fixed wing aircraft, and with the normals to the planar surfaces directed in a vertical plane parallel to the runway, so that a plane on a landing approach with its landing lights or a spotlight on, will receive the brightest retroreflection when descending in line with the runway and at an 2°-6° descending approach path. Since reflectant surfaces of specific qualities are discussed hereafter, it is noted that an ordinary reflectant surface will give (to the pilot) a higher retroreflection when the beam is incident normal to the reflecting surface, than when the beam's direction of incidence is non-normal.

In a preferred aspect of the invention, the reflectant area is covered with retroreflecting material which gives a brighter retroreflection for incident light normal to the plane of the reflector than its retroreflection for light incident at another angle. Thus retroreflecting material and normally reflecting material will give a higher degree of retroreflectivity to normally incident light but the relative drop in retroreflectivity will be greater with ordinary than with retroreflective material. Thus for aircraft approaching the marker from directions other than normal to a reflectant area, the marker with retroreflectant material is easier for the pilot to detect.

With retroreflectant material, the pilot of an approaching aircraft receives, whatever his approach angle, a brighter reflection of his landing lights than with an ordinary reflector, and, because of a quality of the preferred retroreflector, receives the brightest reflection when he is on the correct approach path. Thus the pilot may use the reflection intensity as his guide toward finding and following the correct path.

In a preferred aspect of the invention the panels carrying the reflectant material, (and preferably the whole marker (other than the reflecting layers)) are made of aluminum. Although many of the advantages of aluminum are well known, a particular advantage with this invention is that aluminum has nearly the same coefficient of thermal expansion as the preferred retroreflectant material which is preferably applied as a layer to the panel. Considering the fact that the reflector in according with the invention should be designed to withstand a temperature range of −40° C. to +50° C., the effects of differential thermal expansion between the body of the reflector and the reflectant surface are material and in many situations, the use of aluminum or aluminum alloys is found the best way to avoid buckling or tearing of the retroreflectant material, since the thermal expansion coefficient of aluminum or aluminum alloys is close to that of the preferred retroreflectant material.

By 'aluminum' hereafter, including the claims, I means to include aluminum alloys.

In a preferred aspect of the invention there is, on each panel, in addition to the retroreflectant area, at least one stripe (and preferably two) of fluorescent material. The fluorescent material is designed to give a significant daytime indication to the pilot of the presence and (considering a number of markers collectively) of the direction of the runway, it being understood that the retroreflectant material tends to give a flat impression, not easily noticeable by the pilot when illuminated by sunlight or daylight.

In a preferred embodiment of the invention each of the planar panels is formed of a sheet of material, preferably aluminum, where the panel integrally extends into side walls generally perpendicular to said panels, and means are provided for joining each side wall of a panel to the adjacent side wall of the opposite panel. Preferably each panel side wall will be provided with a inwardly directed flange at its inner end generally perpendicular to the side wall and (at the desired relative angles of the panels) parallel to the flange on the side wall to which it is to be joined. Thus each flange of one side wall of one panel may simply bolted or otherwise attached to the flange of the appropriate side wall of the other panel, to produce the body of the reflector.

In a preferred form of the invention the planar panels, in addition to converging upwardly toward each other also converge in plan from one end toward the other to provide a toed-in effect. Thus vertical planes through the respective panels intersect at an angle of greater than 0 and less than 3°. The result is that the toed-in markers may be arranged on each side of the runway and will give a brighter retroreflection to a pilot descending along a line centered over the runway than with markers where the vertical planes through the marker panels were parallel.

The body of the marker thus produced may be provided with anchoring means, and, if desired, a top member. The anchoring means may of any design, adapted to provide the correct azimuthal orientation of the marker and to provide the correct attitude implying correct slope of the panel sides. Preferably I provide a base plate with side flanges which attach to lower portions of the side walls of the joined body. The base plate may then be mounted on the ground surface beside the runway or on the runway by such means as spikes inserted into the surface or by bolting to a pre-installed base. Shims may be used with the spikes or bolts to achieve the correct attitude and in addition the marker must be installed in the correct azimuthal orientation.

In drawings which illustrate a preferred embodiment of the invention:

FIG. 3 shows the marker of FIG. 2 in exploded view,

FIG. 4 shows a broken-away view of an assembled marker,

FIG. 5 shows an alternative construction for the marker base.

Figure 1:
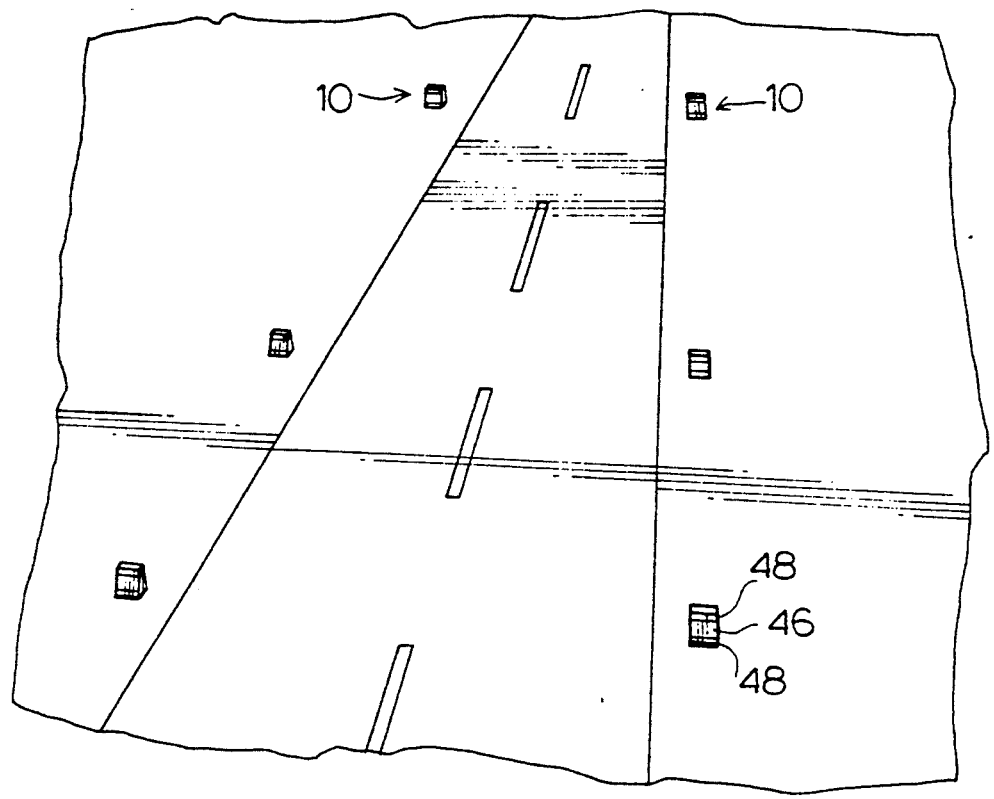
FIG. 1 shows inventive markers marking a runway.

In the preferred embodiment of the invention:

FIG. 1 shows a runway for fixed wing aircraft marked with 6 markers 10 in accord with the invention arranged three on each side of the runway in respectively spaced locations. Each marker has a pair of outwardly facing reflecting panels 12 converging upwardly with (in correct attitude) a slope to the vertical of 2°–6° and, in azimuth, oriented so that a vertical plane parallel to the longitudinal direction of the runway is perpendicular to the planes of the reflecting surfaces of the panels.

Each marker has two planar panels 12. In the preferred construction each panel extends integrally on each side into side walls 14 preferably generally perpendicular to the panels and extending along their height. The side walls are each provided with inwardly turned flanges 16 perpendicular to the side walls and arranged so that the flange 16 of the side wall of one panel may be parallel to and juxtaposed to the flange 16 of the appropriate side wall of the other panel. Registering bolt holes 18 are provided in the flanges so that each abutting pair of flanges may be bolted together to form the completed marker body. The panels 12 and side walls 14 are made of aluminum thick enough to be self sustaining.

The body, as shown is preferably provided with a base plate 18' for mounting the panel. The base plate 18' is preferably made of aluminum, thick enough to be self sustaining and dimensioned to conform to the area defined by the opposed lower edges of the panels and the opposed lower edges of respective pairs of joined side walls. The base is provided with upstanding flanges 20 at opposed edges selected to overlie the outer surfaces of the side walls for attachment thereto, preferably, where aluminum is used, by self tapping screws 22. The base plate is preferably provided with apertures 24 for anchoring means. In FIG. 3 the mode of attachment for anchoring is by spikes 26. The azimuthal orientation of the marker must be selected so that vertical planes through the planar panels are aligned with the runway. The attitude of the marker to ensure the correct angle of the panels to the vertical is then adjusted by the use of appropriately selected shims 28 in the form of washers about selected spikes. In FIG. 5 the base plate is provided with a bolt hole 24B and an arcuate slot 24A about the bolt hole for receiving bolts 30 from a poured concrete base. The arcuate slot allows orientation of the marker to achieve the desired azimuthal orientation and shims 28A may be used about one of the bolts to achieve the desired attitude. The levelling of a marker in its correct attitude may however be performed by other or more sophisticated methods than those shown.

The marker may be provided with a top plate 34 having four side flanges 36 adapted to overlie the top edges of the panels 12 and side walls 14. The top plate may be attached by self tapping screws 40 through registering apertures 38 and 42.

Top plate 34 and base 18' may also be made of self-sustaining aluminum. Top plate 34 and base 18 may each be provided with an aperture 44 (the apertures are vertically aligned) to receive the standard of a marker flag.

The panels 12 will, over most of their area be covered with retroreflecting material 46. I prefer to use a plastic provided with an aluminized coating defining an array of recessed cube corners. Such a retroreflecting material will from relatively wide angles to the normal, retroreflect light from the landing lights (or searchlight) of a descending aircraft. However such retroreflector has a further quality of importance in the preferred form of the invention. The retroreflection at large angles to the normal, of the preferred recessed cube corner reflector is relatively good but retroreflection is strongest when the incident (and hence the reflected) beam are normal to the surface. Thus the pilot, of a descending aircraft may tell when he is on the correct descent path by the fact that the retroreflection from a panel becomes brighter or less bright as he approaches or departs from the descent angle normal to the panel.

I prefer to use a cube corner recessed retroreflector formed of plastic with the cube corner recesses molded in a selectively colored aluminized reflector coating on the outer cube surface. In the preferred form of such material the recessed cube surfaces are covered with a protective transparent smooth layer (not shown) also of plastic to protect and keep clean the recessed cube.

As the retroreflectant material I prefer to use surfaces made up of the cube reflectors as described in the following U.S. Pat. Nos.:

| | |
|---|---|
| 2,380,447 | Jungerson |
| 3,712,706 | Stamm |
| 3,684,348 | Rowland |
| 3,810,804 | Rowland |
| 4,025,159 | |
| 4,202,600 | Burke |

The teachings of the above patents are incorporated herein by reference.

In particular the invention preferably makes use of cube corner reflective sheeting as described in the Burke U.S. Pat. No. 4,202,600 where regular arrays of cube corner reflectors in sheets are arranged in zones (indistinguishable to the user) oriented relative to adjacent zones in such a way that retroreflective intensity variation with azimuthal angle (measured in the plane of the sheet), is reduced at high angles of incidence to the normal to the sheet.

By an array is meant an ordered group of cube corner triads. A 'zone' is the area occupied by such an array.

The invention takes advantage of the fact that retroreflectant material composed of arrays of cube corner reflectors (which are not individually distinguishable at minimum expected viewing distances) customarily retroreflect incident light more strongly at a normal angle of incidence than at any other angle of incidence.

It is noted that with all cube corner reflector arrays there is some directivity in the strength of the secondary reflection. That is for a given array zone the secondary reflection will be stronger in some azimuthal directions relative to the normal than other. This is or course more noticeable with a single array where all triads have an ordered orientation relative to each other. It will also be noted that the cube corner reflector array zones which are taught by U.S. Pat. No. 4,202,600 and preferred for use with the invention, are too small for resolution by the viewer so that the actual orientation of individual zones of the reflecting surface is not known when a sheet bearing the reflectant coating is applied. Thus it is preferable if the cube corner reflector sheet is divided into zones (indistinguishable at usual viewing distances) which are differently oriented relative to each other tending to give a more uniform reflection at large angles to the normal and at varying azimuthal angles about the normal.

Preferably the cube corner cavity material is that sold under the trade mark REFLEXITE, a product of the Reflexite Corporation of New Britain, Connecticut. In such product the cube corner cavities are arranged in windows formed by triads of mutually perpendicular cube faces in an ordered array with a predetermined orientation. Such ordered arrays are in zones small enough to be indistinguishable to the viewer at minimum normal viewing distances. The zones are preferably arranged to have two orientations at 90° to each other arranged in a checkerboard or other pattern. The REFLEXITE material customarily is supplied in rolls with a self adherent backing.

Figure 6:
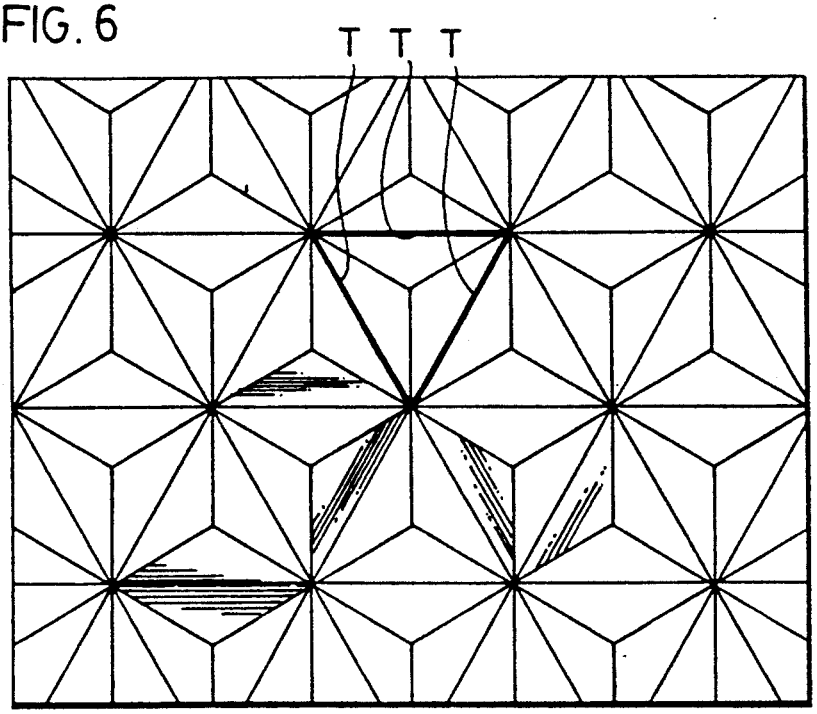
FIG. 6–8 show preferred retroreflectant material
Figure 8:
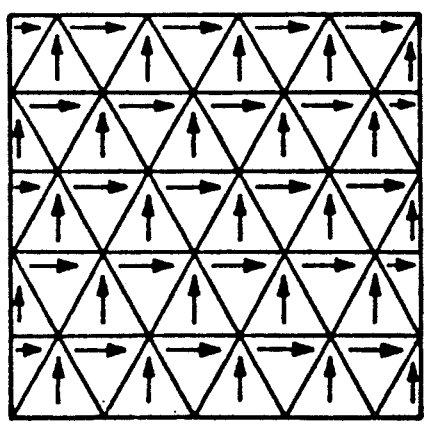
Figure 7:
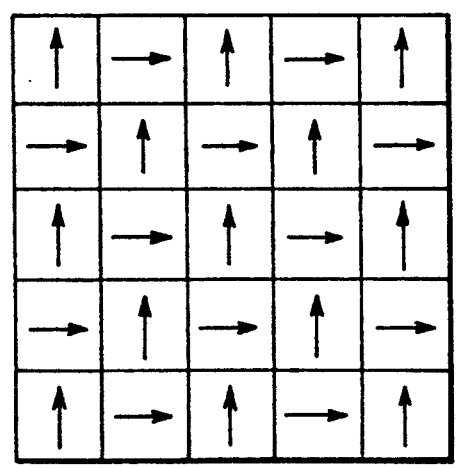

FIGS. 6-8 are taken from U.S. Pat. No. 2,202,600 previously referred to. In FIG. 6 the preferred retroreflective sheeting is schematically illustrated from the non-retroreflecting side. The array as oriented in FIG. 6 may be thought of as having an orientation corresponding to a horizontal directional arrow. As stated in U.S. Pat. No. 4,202,600 the orientation of an array with an orientation as shown in FIG. 6 can be varied in a regularly alternating pattern, such as a checkerboard pattern, in a random pattern or in any other pattern that provides sufficient mixing of different orientations to give the sheet an appearance of uniform brightness when viewed at a high angle of incidence from the minimum.

FIGS. 7 and 8 show two preferred methods of combining arrays in zones with orientations at 90° to each other. Since the arrays have 60° symmetry (90°-60°=30°) each zone has its cube corner reflectors oriented at 30° to adjacent zones. The result is reflective sheeting which for retroreflected rays at 60° to the normal, has relatively even reflectivity at different azimuthal angles about the normal.

As previously stated the preferred sheeting of the Reflexite Corporation of New Britain Connecticut. The zones are indistinguishable at normal minimum viewing distance.

It is noted that the two qualities of the preferred material which are of principal value with this invention, are that the night retroreflection at relatively wide angles to the normal to the plane allows the pilot, at night, to find the general location of the runway and its markers, while the stronger retroreflection when the pilot is on his correct descent path acts as an indicator to help him to reach and maintain the correct descent path.

The preferred retroreflecting material is customarily supplied in rolls, from which the may be cut for adhesive application to panels 12 to form, as shaped by the planar panels, a substantial planar retroreflecting area 46. Such area will be principally used at night and I prefer to use retroreflecting material of silver color.

Since the marker should be designed to operate over a temperature range of −50° to 40° C., it is of some importance that the thermal expansion coefficient of the retroreflectant layer be close to that of the panels 12. With the preferred retroreflecting material as described above the planar panel is preferably made of aluminum since its coefficient of thermal expansion is sufficiently close to that of the preferred "Reflexite" as to prevent, in most circumstances, the buckling or tearing of the 'Reflexite' over the above temperature range.

In this embodiment it is preferred to make the marker other than the reflecting layer or layers of a single piece of aluminum sheet, of sufficient thickness to sustain its shape and bent to form the panels 12, side walls 14 and flanges 16 as described.

Although the retroreflectant material works excellently at night when illuminated by the searchlight or landing light of an aircraft, such material is difficult to distinguish in sunlight or ambient daylight which, of course, is not normally retroreflected to the pilot. Accordingly, it is preferred to provide at least one and preferably upper and lower stripes 48 of fluorescent material, above and below each area 10 and oriented to be horizontal in the preferred attitude of the marker. Such bars are preferably formed of self-adhesive fluorescent tape of color contrasting with that of area 46 (fluorescent orange is preferred for strips 48) and overlying each panel 12 above and below each area 46 (as shown) and alternatively the material forming area 46 may be cut to cover the whole area of panel 12, and the upper and lower fluorescent stripes 48 placed thereover.

There is thus provided, for daytime use, the marker with two horizontal stripes 48 which assist the pilot in locating the runway, and its azimuthal orientation, and to indicate horizontal indications in directions transverse to the runway. The bars 48 of course do not strongly retroreflect nor do they give the pilot an indication of whether he is descending at the correct angle. They are however useful in the daytime when the retroreflectant material looks dull under solar or ambient light illumination.

The embodiment of FIG. 5 shows a poured concrete base 50 which would be located beside the runway and which has a pair of upstanding bolts 30. The base 18A is rotated about the bolt through hole 24B until the correct azimuthal orientation is obtained, and then the nuts 52 are tightened to fix the tray firmly in place. The marker is then installed on the tray as described in connection with FIG. 3 and 4.

It should be said that any method of anchoring and levelling is within the scope of the invention.

The preferred embodiment has been described with angular slope of the panels 12 suitable for fixed wing aircraft. This is believe to be the principal use of the invention.

However the invention may also be used to mark helicopter pads and launching areas. For use with helicopters, the panels 12 and their retroreflective material should converge at 16°-20° and, in the correct marker attitude slope at 8°-10° to the vertical, corresponding to the desired helicopter descent angle. The panels will, in use, be oriented to be perpendicular to a vertical plane extending in the desired azimuthal approach direction.

Figure 2:
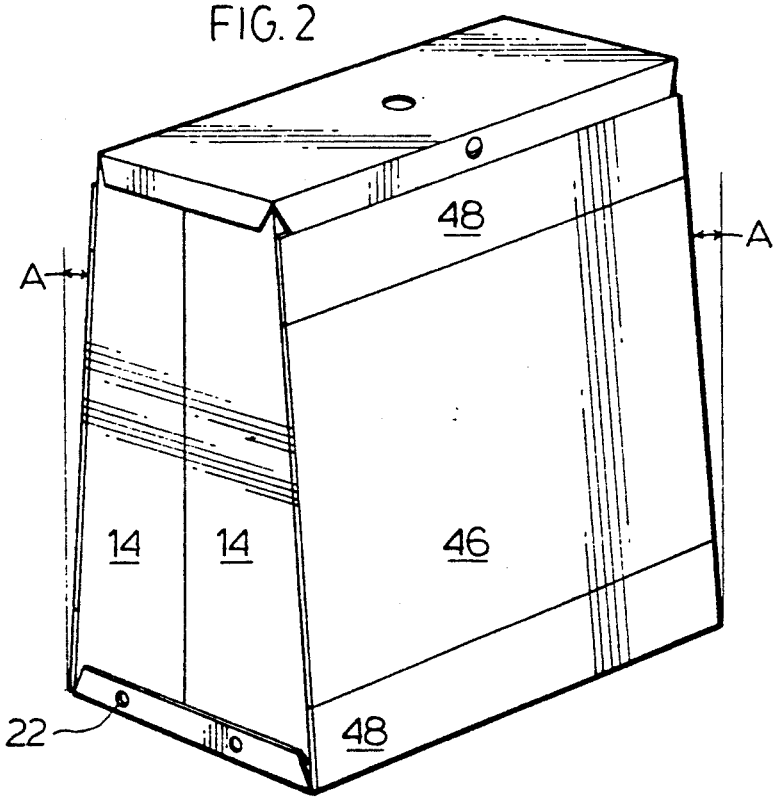
FIG. 2 shows an assembled marker.
Figure 10:
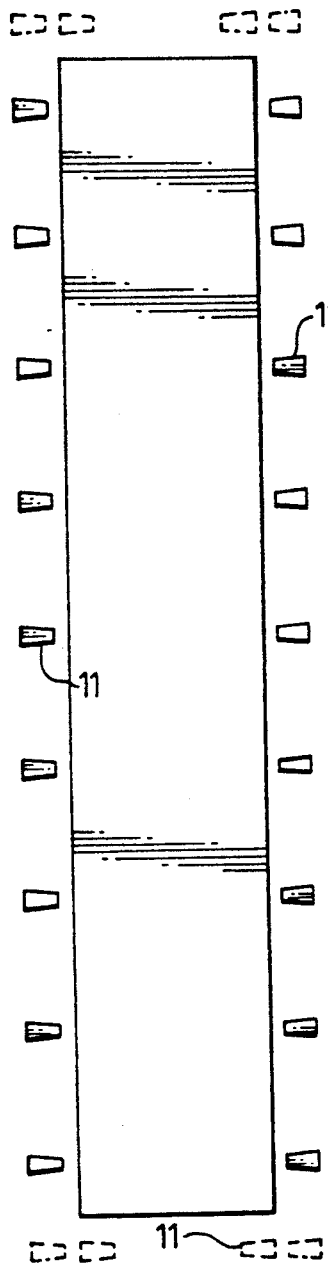
FIG. 10 shows a runway marked with the marker of FIG. 9.
Figure 9:
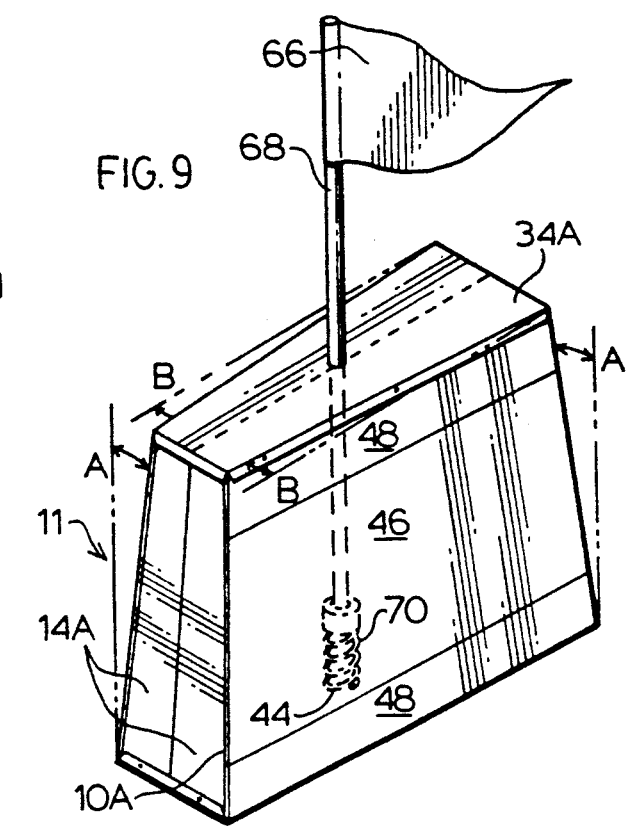
FIG. 9 shows a modified form of the inventive marker

FIG. 9 shows a form 11 of the marker which is a modified alternative to that shown in FIG. 2. FIg. 9 shows that the members 10A, 14A, 34A (corresponding in function to members 12, 14 and 34 are so proportioned that opposite faces of the planar panel slope toward each other at an angle A to the vertical as with the panel of FIG. 2. This for FIg. 9 (or FIg. 2) the angle A is 2°–6° for fixed wing aircraft and 8°–10° for helicopters. FIG. 9 further shows that it is preferred to have the planar panels 'toed-in' toward each other by the angle B (making the angle of convergence 2B). for most applications B will equal about 1°. Although such convergence is best shown only at the top of the marker, the planar panels are arranged so that they converge at substantially the same angle in any horizontal section through the marker. FIG. 10 shows, in plan, a plurality of the markers of FIg. 9. The advantage of the toed-in arrangement will be obvious from FIG. 10. Thus, as shown, the toed-in is achieved by orienting the planar panels so that vertical planes perpendicular to the panels intersect at an angle of greater than 0° and less than 3°. Thus as shown the toed-in markers will tend to self retro-reflect from each side of the runway toward an aircraft approaching along the center of the runway axis, more clearly than would markers as in FIG. 2 where the vertical planes, normal to the planar panels are parallel to each other.

Thus in the alternative of FIGS. 9 and 10 the toes-in planar panels 10A are provided with central retroreflecting layers 46 bordered by upper and lower fluorescent stripes 48 as in the embodiment of FIGS. 2 and 3.

FIG. 9 also illustrates the provision of a marker pennant 66 on a standard 68 which passes through upper aperture 44 to seat on a spring 70 which rests in lower aperture 44.

Figure 11:
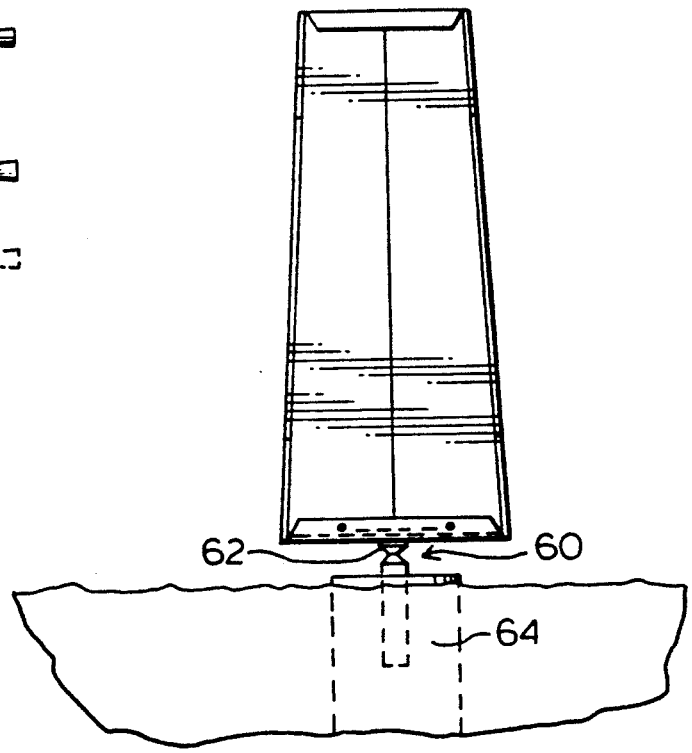
FIG. 11 shows a frangible mount for the marker.

FIG. 11 demonstrates that the reflecting marker constructed as described in relation to either FIg. 2 or FIG. 9 may be mounted on a frangible standard 60 of plastic which is molded to provide an easily frangible narrowing 62. The Frangible standard is mounted in a base 64 in any conventional manner while the base may be embedded int eh ground beside a runway or may be free standing. The provision of the frangible mount means that, if a marker is struck by an errant aircraft, it may break off with less damage to the aircraft than would a fixed marker.

The various embodiments show retroreflecting material 46 on the two sloping sides 10 bordered by upper and lower fluorescent strips 48. It is understood that, if desired, end walls 14 or 14A may be provided with a similar arrangement having a central area of retroreflectant material similar to material 46 bordered by upper and lower stripes of fluorescent material similar to strips 48.

FIG. 10 indicates, in dotted form, that markers 11 may be arrayed across each end of the runway, to indicate the runway limits.

I claim:

1. A marker for resting on a support surface in a predetermined attitude comprising a pair of substantially planar metal panels facing approximately away from each other in azimuthal directions, and each sloping upwardly toward the other at an angle between 2° and 6° to the vertical in such attitude, and retroreflectant material covering a substantial area of each of said panels, wherein at least one fluorescent stripe is located on each of said panels which stripe is horizontal in said predetermined attitude, said stripe having a color contrasting with that of said substantial area.

2. The marker as claimed in claim 1 wherein said material is formed with cube corner cavities has a higher retroreflectivity for light incident normal to the plane of each of said panels and a substantial but lower retroreflectivity for light incident at angles other than normal to said panels.

3. The marker as claimed in claim 2 wherein said panels are made of aluminum thick enough to be self sustaining and said retroreflectant material is formed with cube corner cavities and is a layer attached to the outwardly facing surfaces of said panels.

4. The marker as claimed in claim 3 wherein said marker is shaped to provide that vertical planes through said panels intersect at an angle of greater than 0° and less than 3°.

5. The marker as claimed in claim 1 wherein said panels are formed of aluminum thick enough to be self sustaining and said retroreflectant material is formed with cube corner cavities and is a layer attached to the outwardly facing surfaces of said panels.

6. A marker for resting on a support surface in a predetermined attitude comprising a pair of metal panels facing approximately away from each other in azimuthal directions, and each sloping upwardly toward the other at an angle of between 8° and 10° to the vertical in such attitude, and retroreflectant material covering a substantial area of each of said panels, wherein at least one fluorescent stripe is located on each of said panels which stripe is horizontal in said predetermined attitude, said stripe having a color contrasting with that of said substantial area.

7. The marker as claimed in claim 6 wherein said material is formed with cube corner cavities and has a higher retroreflectivity for light incident normal to the plane of each of said panels and a substantial but lower retroreflectivity for light incident at angles other than normal to said panels.

8. The marker as claimed in claim 7 wherein said panels are made of aluminum thick enough to be self sustaining and said retroreflectant material is formed with cube corner cavities and is a layer attached to the outwardly facing surfaces of said panels.

9. The marker as claimed in claim 6 wherein said panels are formed of aluminum thick enough to be self sustaining and said retroreflectant material is formed with cube corner cavities and is a layer attached to the outwardly facing surfaces of said panels.

* * * * *